(12) United States Patent
Halford et al.

(10) Patent No.: US 7,961,320 B2
(45) Date of Patent: Jun. 14, 2011

(54) COLOR MANAGEMENT SYSTEM WITH SYSTEM-LEVEL COMMUNICATIONS

(75) Inventors: Chris Halford, Andover, MA (US); Alex Cohen, Montreal (CA)

(73) Assignee: X-Rite, Inc., Grand Rapids, MI (US)

( * ) Notice: Subject to any disclaimer, the term of this patent is extended or adjusted under 35 U.S.C. 154(b) by 766 days.

(21) Appl. No.: 11/880,174

(22) Filed: Jul. 20, 2007

(65) Prior Publication Data
US 2009/0021737 A1    Jan. 22, 2009

(51) Int. Cl.
*G01J 3/46* (2006.01)
(52) U.S. Cl. .................................. 356/402; 356/405
(58) Field of Classification Search .......... 356/402–425, 356/941; 345/589–600, 604–605, 549, 690, 345/22, 72, 83, 88; 358/2.1, 500–504, 515–520
See application file for complete search history.

(56) References Cited

U.S. PATENT DOCUMENTS

| 5,528,261 A | 6/1996 | Holt | |
|---|---|---|---|
| 2004/0109161 A1 * | 6/2004 | Stranzl et al. | 356/425 |

OTHER PUBLICATIONS

Joshi et al., Exploiting an Event-Based Communication Infrastructure for Rule Based Alerting in Sensor Webs, Database and Expert Systems Applications, 2005, Proceedings, Sixteenth International Workshop on Copenhagen, Denmark, Aug. 22-26, 2005, Piscataway, NJ, USA, IEEE, Aug. 22, 2005.
Mann, et al., Middleware Support for Global Access to Integrated Computational Collaboratories, Proceedings 10th IEEE International Symposium on High Performance Distributed Computing IEEE Comput. Soc. Los Alamitos, CA, USA, 2001, ,pp. 35-46.
European Search Report dated Oct. 27, 2008.

* cited by examiner

*Primary Examiner* — Gregory J Toatley
*Assistant Examiner* — Tri T Ton
(74) *Attorney, Agent, or Firm* — McCarter & English, LLP

(57) ABSTRACT

Color management systems and methods are provided wherein operations associated with an individual color measurement instrument are integrated into system-level operating software. Color measurement-related information associated with or derived from such color measurement instrument, e.g., color measurements, instrument-related messages (e.g., error messages), instrument status and the like, is automatically broadcast to other programs, instruments and/or applications that are adapted/registered to listen for and receive such broadcasts. An operating system program that includes, defines or interacts with an OS notification center facilitates communication with the ancillary programs, instruments or applications. Two way communications by way of the OS notification center are also facilitated.

17 Claims, 3 Drawing Sheets

COLOR MANAGEMENT SYSTEM WITH SYSTEM-LEVEL COMMUNICATIONS

BACKGROUND

1. Technical Field

The present disclosure is directed to color management systems and methods wherein operations associated with an individual color measurement instrument are integrated into system-level operating software such that information associated with or derived from such color measurement instrument, e.g., color measurements, instrument-related messages (e.g., error messages), instrument status and the like, is automatically broadcast to other devices, systems and/or applications that are adapted to listen for and receive such broadcasts. In addition, the disclosed systems and methods advantageously support and facilitate two-way communications, i.e., from "listening devices" to color measurement instrument(s).

2. Background Art

Color management is an important aspect of many industrial and commercial operations. For example, vendors and suppliers are routinely called upon to manufacture and supply products/components that meet specific color-related criteria. Similarly, various print operations benefit from color matching and/or color control functionalities. Color management generally implicates a variety of issues, including the color space used to define a given color (e.g., RGB, CYMK, etc.) and issues associated with performance of an individual color measurement device (e.g., calibration, profile, etc.). Various techniques are used to "standardize" and/or "correct" color management values to facilitate color management, including algorithmic transforms and the like.

In typical color management systems, a particular color measurement instrument may be adapted to communicate with other color measurement instruments, e.g., over a network. Color measurement instruments may also be adapted to communicate with control systems and/or control software, such that individual color measurement values may be used to control ancillary operations. For example, a spectrophotometer, colorimeter or densitometer may be used to measure the color properties of a particular substrate, and such color properties may be input to a database and/or software application that uses such color property data to drive downstream functionality, e.g., a color display on a computer monitor, print operations or the like.

In conventional color measurement operations, it is necessary for each color measurement instrument to establish a direct communication link from application-to-device. To effectuate such communication link, it is generally necessary for a developer to implement a proprietary device software development kit (SDK) for each such communication channel. In addition, conventional application-to-device communications establish a direct and an exclusive communication channel that blocks other devices/applications from accessing such communication channel. As such, a blocking connection may be established with respect to a particular application/instrument in conventional systems, thereby precluding further and/or alternative connections to such application/instrument while the initial blocking connection is in place or otherwise active. The limitations of prior art systems thus impede system level communication of color values and related information, and add significant effort/inconvenience to establishing system-level color measurement-related communications.

Thus, despite efforts to date, system-level communications associated with color measurement and/or color management have not been streamlined and/or facilitated such that color measurement devices may be automatically, efficiently and effectively included in system-level communications. In addition, color measurement and color management systems do not facilitate automatic, system-wide dissemination and/or accessibility of color measurement values and instrument-related information (e.g., error messages/status) in an efficient and reliable manner. These and other shortcomings are addressed and/or overcome by the systems and methods disclosed herein.

SUMMARY

The present disclosure provides advantageous systems and methods for facilitating system-level communications associated with color measurement and/or color management. The disclosed systems and methods permit an individual color measurement device, e.g., a spectrophotometer, colorimeter or densitometer, to be included in system-level communications by way of an application-level communication interface with respect to such individual color measurement device. Unlike conventional communication systems, the disclosed systems and methods do not require application-to-device communication channels; rather, the communication interface(s) of the present disclosure are established between an individual color measurement device and an associated operating system, e.g., through an application programming interface (API), such that communications between the color measurement device and ancillary programs, instruments and/or applications is automatic, efficient and easily implemented. The disclosed color measurement and color management systems/methods offer significant advantages relative to existing systems/methods, including the facilitation of automatic, system-wide dissemination and/or accessibility of color measurement values and information concerning individual color measurement instruments, e.g., instrument-related messages (such as error messages), instrument status and the like.

According to exemplary embodiments of the present disclosure, the disclosed systems and color measurement/management methods include one or more color measurement devices that are adapted to make color measurements and capture color measurement values, e.g., one or more spectrophotometers, calorimeters and/or densitometers. The disclosed systems and methods may be implemented without any modification to existing color measurement instrumentation. Rather, the disclosed systems and methods may be easily applied to and utilized with commercially available color measurement instruments, thereby enhancing the breadth and ease with which broad-scale implementation may be effectuated. Indeed, implementation of the disclosed systems and methods is largely achieved at a software/programming level, such that color measurement-related information from a color measurement device is automatically communicated to the operating system and broadcast to programs, instruments and/or applications that are adapted to "listen" for such broadcast(s).

Each color measurement instrument associated with the disclosed system/method includes a processor that generally controls operations and communications by such color measurement instrument. The processor includes an operating software (OS) program that functions in the manner of a daemon to (i) maintain a continuous connection with the color measurement instrument through an API, (ii) broadcast color measurement-related information to programs, instruments and/or applications that are programmed to listen for such broadcasts, and (iii) receive commands or other input from such "listening" programs, instruments and/or applications. The OS program/daemon thus facilitates two-way communications between the color measurement device and "listening" programs, instruments and/or applications to ensure continuous, uninterrupted communications therebetween. Moreover, the bi-directional communications that are supported and facilitated by the disclosed OS program/daemon obviate the need to establish individual communication channels between the color measurement device and ancillary programs, devices and/or applications, thereby greatly enhancing the ease and effectiveness of communications involving color measurement-related information.

The disclosed OS program/daemon is generally supported by and operates in conjunction with a conventional operating system that controls, inter alia, the fundamental processor-related operations. Thus, beyond supporting the disclosed OS program/daemon, the conventional operating system is typically adapted to recognize keyboard/mouse input, output transmission from the color measurement instrument to a monitor and/or printer, perform file and directory management functions, and/or implement system security functionality. The conventional operating system also provides a platform upon which other programs/applications may run, e.g., calibration-related applications.

Thus, the disclosed OS program/daemon that is associated with and run on the processor of the present disclosure is adapted to receive and process color measurement-related information directly from the color measurement instrument. Such color measurement-related information may include ambient, emissive, transmissive and/or reflective light measurements, and other light-related measurements as are known in the art or may be developed in the future. Indeed, the disclosed systems and methods provide an advantageous communication regimen that can be applied to the transfer/communication of any and all color measurement-related information. The OS program/daemon of the present disclosure is also adapted to monitor and process color measurement-related information that generally relates to the status and operation of the color measurement instrument, e.g., operational messages such as error messages, instrument status information (e.g., on/off, initiating color measurement reading, calibrating, etc.).

To facilitate the broadcast and bi-directional communication functionalities of the disclosed systems and methods, the disclosed OS program/daemon is further adapted to run, support and/or communicate with a "notification center" that functions to (i) automatically make available/broadcast color measurement-related information to ancillary programs, instruments and/or applications, and (ii) receive communications and/or commands from such ancillary programs, instruments and/or applications. The notification center thus functions as an interface hub that automatically broadcasts color measurement-related information to any and all programs, instruments and/or applications that are programmed to listen for such broadcast(s) and, in like measure, automatically receives commands, communications or the like from any such "listening" program(s), instrument(s) and/or application(s). Upon receipt of a command, communication or other input from a listening program, instrument or application, the "notification center" is programmed/adapted to automatically transmit such command, communication or other input to the color measurement device. In this way, two-way communications are effectuated without the need for establishing a direct application-to-application communication channel between the color measurement device and an ancillary program, instrument and/or application.

Thus, exemplary implementations of the disclosed color measurement system and method further include one or more ancillary programs, instruments and/or applications that are in communication with the OS notification center. Such ancillary programs, instruments and/or applications may be termed "listening" elements in that each is adapted to listen for broadcasts from the OS program/daemon—by way of the OS notification center—and to receive transmissions of color measurement-related information therefrom. However, a listening element may be programmed to selectively receive and process broadcasted information. Thus, individual listening elements may have a need for certain aspects of the color measurement-related information, but no use for other aspects of such color measurement-related information. In such circumstance, the disclosed system/method advantageously limits the transmission of information to individual listening elements to the color measurement-related information that is needed/desired by such individual listening element.

The listening elements are generally programmed to receive and process color measurement-related information that is made available by the OS program/daemon at the OS notification center. Communications between the listening elements and the OS program/daemon are generally subject to appropriate security clearance/validation and such communications may be advantageously encrypted, particularly when transmitted over a network, such as an intranet, extranet and/or the Internet. Communications between the OS program/daemon and the listening element(s) may be two-way. Thus, the listening element(s) may be programmed to communicate/transmit information and/or commands to the disclosed color measurement instrument, such communications being received by and processed by the OS program/daemon by way of the OS notification center. Implementation of information and/or commands received from a listening element may take place at the OS program level, e.g., through direct communication to the color measurement device, or may involve, in whole or in part, communications to and/or operations by an ancillary program/application, e.g., a calibration program or the like.

Automatic broadcast of color measurement-related information, e.g., color measurement values and information related to the status/operation of a color measurement instrument, advantageously makes available such color measurement-related information for access and use by any other instrument, device and/or system associated with the disclosed system/method. Thus, in exemplary implementations of the disclosed system and method, various programs, instruments and applications are adapted to listen for broadcasted color measurement-related information, and the broadcast information becomes available for immediate use, e.g., in guiding or controlling ancillary operations and/or decision-making. In addition, the broadcast functionality and transfer of color measurement-related information is available in a continuous, uninterrupted manner, i.e., there is no need to log-on or otherwise initiate broadcast and/or transmission of color measurement-related information to a listening element that includes appropriate interface programming and security clearance. Moreover, there is no need for each application to connect to a device SDK, thereby blocking other communications. In this sense, the disclosed system and method offers a "connection-less" mode for sharing color measurement-related information. The disclosed systems and methods also facilitate two-way communications between such listening element(s) and the color measurement device in the same "connection-less" mode.

Additional advantageous features, functionalities and benefits associated with the disclosed color measurement/color management systems and methods will be apparent from the description which follows, particularly when read in conjunction with the appended figures.

BRIEF DESCRIPTION OF FIGURES

To assist those of ordinary skill in making and using the disclosed systems and methods, reference is made to the accompanying figures, wherein.

DESCRIPTION OF EXEMPLARY EMBODIMENT(S)

Figure 1:
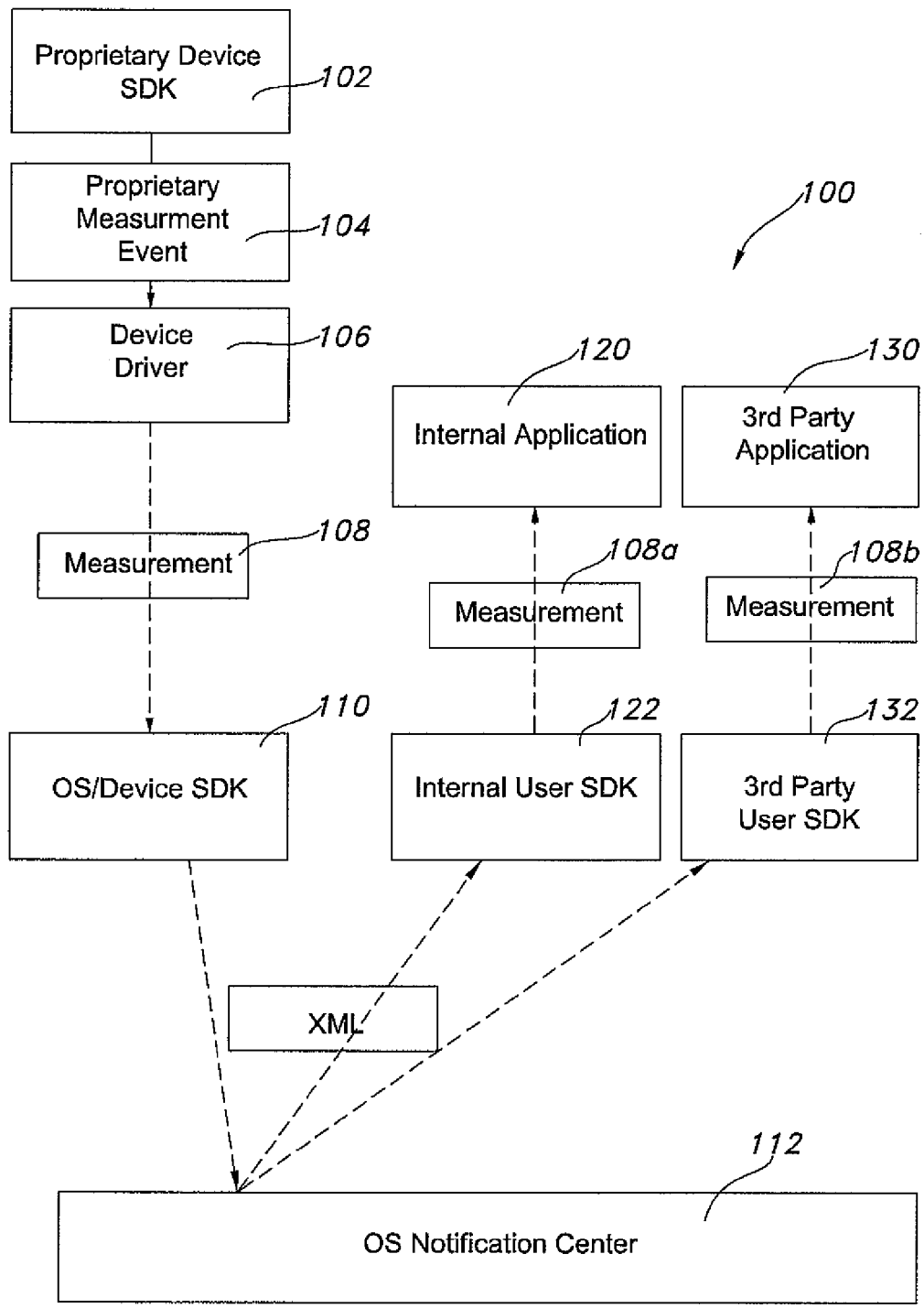
FIG. 1 is a flowchart that schematically depicts communications associated with an exemplary embodiment of the present disclosure.

The disclosed systems and methods facilitate system-level communications associated with color measurement and/or color management. Individual color measurement devices are adapted to communicate color measurement-related information to ancillary programs, instruments and/or applications on an automatic and efficient basis, without establishing direct application-to-device communication interface between such individual color measurement device and the ancillary programs, instruments and/or applications. Such communications are effected through an advantageous operating system (OS) program/daemon that is adapted to receive, broadcast and transmit color measurement-related information to ancillary devices, applications and/or users that are listening for such information. The broadcast and transmission of color measurement-related information is generally effectuated in real time with respect to ancillary programs, instruments and/or applications that are programmed to receive such information. Two-way communication with respect to such ancillary programs, instruments and/or applications is also supported and facilitated by way of the disclosed OS program/daemon and associated OS notification center.

For purposes of the present disclosure, the term "color measurement-related information" encompasses any and all data, information and/or values that are collected and/or generated by a color measurement instrument, e.g., a spectrophotometer, colorimeter or densitometer, related to the operation of a color measurement instrument. Thus, for example, parameters associated with making color measurement determinations, values obtained from such color measurement determinations, corrections and/or adjustments to such color measurement values are included within the term "color measurement-related information." Also included within the term "color measurement-related information" are messages and/or signals associated with operation of the color measurement instrument, e.g., error messages, and status information concerning the color measurement instrument, e.g., on/off, initiating color measurement reading, calibrating and the like.

According to exemplary embodiments of the present disclosure, a color measurement instrument adapted to make color measurements and capture color measurement values is provided. The color measurement instrument may take various forms. Thus, for example, the color measurement instrument may be a spectrophotometer, colorimeter or densitometer. The color measurement instrument includes or communicates with a processor. The design and operation of the processor is not critical to the present disclosure, except insofar as the processor must be adapted to operate an operating system (OS) program/daemon and associated OS notification center with the functionalities described herein. Thus, conventional processor hardware may be employed according to the present disclosure, e.g., one or more microprocessors, BIOS chips(s), CMOS chip(s) and associated memory (e.g., in the form of a hard drive and/or ancillary memory storage).

The processor associated with the color measurement instrument includes an operating system (OS) program/daemon that is generally supported by a conventional operating system. The conventional operating system generally supports or facilitates operations of the disclosed OS program/daemon and may also control, inter alia, the fundamental operations of the color measurement instrument. Thus, the conventional operating system is typically adapted to interact with conventional ancillary components/drivers, e.g., receiving input from a keyboard and/or mouse, outputting commands to hardware devices such as a printer and a monitor, supporting security functionality, and the like. The conventional operating system may also be adapted to receive and transmit information with respect to a broad range of ancillary applications and operations, including programs that are specific to color measurement operations, e.g., instrument calibration operations.

With reference to FIG. 1, an exemplary flow chart 100 is provided for an exemplary implementation of the disclosed systems and methods. As shown in flow chart 100, a measurement instrument (not pictured) includes a proprietary device SDK (software development kit) program 102 that facilitates measurement operations of the color measurement instrument, e.g., a spectrophotometer, calorimeter or densitometer. SDK 102 is referred to as "proprietary" because such SDKs are generally unique and proprietary to individual manufacturers of color measurement instruments. The use and operation of SDK 102 for manufacturer-specific color measurement instruments are well known to persons skilled in the art.

Based on the parameters of proprietary device SDK 102, a proprietary measurement event 104 is encountered or otherwise initiated for the color measurement instrument. Again, measurement event 104 is referenced as "proprietary" because the operation of individual color measurement instruments generally reflects proprietary know-how/intellectual property of the instrument manufacturer. Of note, the systems and methods of the present disclosure, as reflected in exemplary flow chart 100, have widespread application, including applications that involve proprietary color measurement instruments manufactured by non-affiliated third parties. With further reference to FIG. 1, the proprietary measurement event 104 generally triggers/powers a device driver 106 that initiates a color measurement 108. As will be readily apparent to persons skilled in the art, measurement 108 may be effected with respect to any object or surface. Triggering of the color measurement may be manually effected by a system user, e.g. through interaction with a keyboard, mouse or the like. The color measurement may also be triggered based on an automated or electronic command, e.g., based on preset periodic color measurements or a color measurement command from an ancillary program, instrument or application.

Measurement 108 generates color measurement value(s) that are example(s) of color measurement-related information for purposes of the present disclosure. Thus, according to the present disclosure, the color measurement values generated by measurement 108 are advantageously communicated directly to an operating system (OS) program/daemon that is adapted to receive and broadcast such color measurement-related information. The OS program/daemon of the present disclosure may also receive additional information concerning the color measurement instrument in association with measurement 108, e.g., instrument status and/or error message(s) associated therewith. To facilitate communication with the OS program/daemon of the present disclosure, an OS/Device SDK 110 is generally implemented. Exemplary aspects of an OS/Device SDK 110*a*, 110*b* are set forth in FIG. 2 hereto. As will be readily apparent, the OS/Device SDK 110 functions as an API that facilitates direct communication between the color measurement instrument and the disclosed OS program/daemon. The precise design and programming of such OS/Device SDK is likely to vary from implementation-to-implementation, as will be readily apparent to persons skilled in the art. In exemplary embodiments, however, a specific SDK will be supplied to handle communications associated with the present disclosure and the device developer will just plug into this functionality With further reference to FIG. 1, color measurement-related information associated with measurement 108 is communicated directly to the OS program/daemon by way of OS/Device SDK 110. The OS program/daemon automatically makes such color measurement-related information available for communication to ancillary programs, instruments and/or applications at OS Notification Center 112. Information packets may be transferred in various languages and/or formats, e.g., XML, CxF, SGML, XTalk, etc. As shown in the flow chart of FIG. 1, exemplary communications according to the present disclosure are effected by coding color measurement-related information as XML.

Upon receipt of color measurement-related information at OS Notification Center 112, OS programs/daemons implemented in accordance with the systems and methods of the present disclosure automatically and blindly broadcast the availability of such color measurement-related information to ancillary programs, instruments and/or applications using the functionalities of OS Notification Center 112. In exemplary embodiments of the present disclosure, OS Notification Center 112 utilizes functionalities associated with Windows Event Log (Microsoft Corp.; Redmond, Wash.), Mac DNS (Apple Inc., Cupertino, Calif.) or other third party event logging software/application. Alternatively, the functionalities of OS Notification Center 112 may be derived from and driven by non-commercial programming that is adapted to provide comparable broadcast notification/communication functionalities.

OS Notification Center 112 advantageously communicates with one or more programs, instruments and/or applications that have potential use for the color measurement-related information that is received thereby. For purposes of the exemplary flow chart 100 of FIG. 1, two (2) exemplary instruments/applications are schematically depicted as receiving broadcasts from OS Notification Center 112. However, it is to be understood that the systems and methods of the present disclosure are not limited to implementations where only two such programs, instruments and/or applications receive broadcasts from OS Notification Center 112. Rather, as will be readily apparent to persons skilled in the art, the disclosed systems and methods may be easily scaled so as to include/support greater numbers of ancillary programs, instruments and/or applications.

To facilitate communications with an ancillary program, instrument and/or application, a further SDK is generally provided for such ancillary program, instrument and/or application. Thus, as shown in FIG. 1, an internal application 120 and a $3^{rd}$ party application 130 having potential use for the color measurement-related information that is available at OS Notification Center 112 include SDKs to facilitate data transfer therebetween. More particularly, internal application 120 includes internal user SDK 122 and $3^{rd}$ party user SDK 132. Such SDKs 122, 132 are generally identical—differing only in that they are implemented with respect to two distinct softwares/applications—and function as APIs to facilitate communications therebetween. Through interaction of OS Notification Center 112 and SDKs 122, 132, the measurement values 108*a*, 108*b* are transferred to internal application 120 and $3^{rd}$ party application 130, respectively. Such measurement values may also be transmitted to other ancillary programs, instruments and/or applications from OS Notification Center 112. In addition, the disclosed OS program/daemon may also interact or otherwise communicate with an ancillary application/program that functions to store such measurement values in associated data storage, thereby maintaining the measurement values (and other color measurement-related information) for ongoing and/or future access and use.

In addition, it is noted that SDKs 122, 132 may be utilized to transfer commands/information from ancillary programs, instruments and/or applications to the color measurement instrument, i.e., by way of OS Notification Center 112, thereby effecting two-way communications between such ancillary program, instrument and/or application and the color measurement instrument. Implementation of information/commands received from an ancillary program, instrument and/or application, i.e., a listening element, may take place at the OS program/daemon level or may involve, in whole or in part, operations by one or more ancillary programs/applications, e.g., a calibration program or the like.

Figure 2:
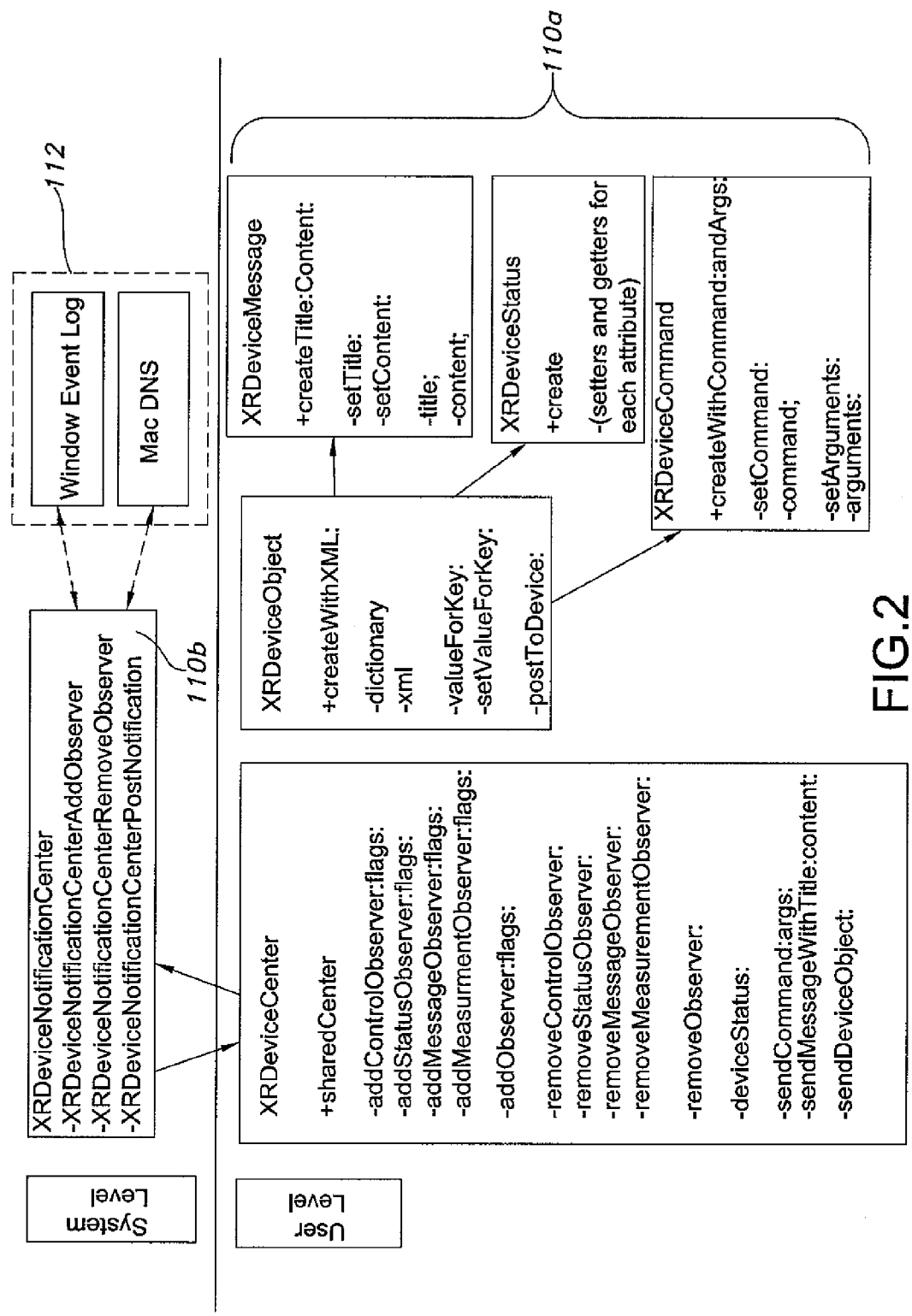
FIG. 2 is a schematic illustration of exemplary programming functionalities associated with an exemplary implementation of the disclosed system/method.

With further reference to FIG. 2, SDKs 110*a*, 110*b* reflect user level and system level aspects of SDK 110, respectively. Together, the two SDK aspects 110*a*, 110*b* facilitate communications between a color measurement instrument and OS Notification Center 112. For illustration purposes, OS Notification Center 112 is shown as encompassing commercially available event notification programs, namely the Windows Event Log program and the Mac DNS program. However, as noted previously, the systems and methods of the present disclosure are not limited by or to such exemplary SDKs and/or such exemplary OS Notification Center implementations.

Figure 3:
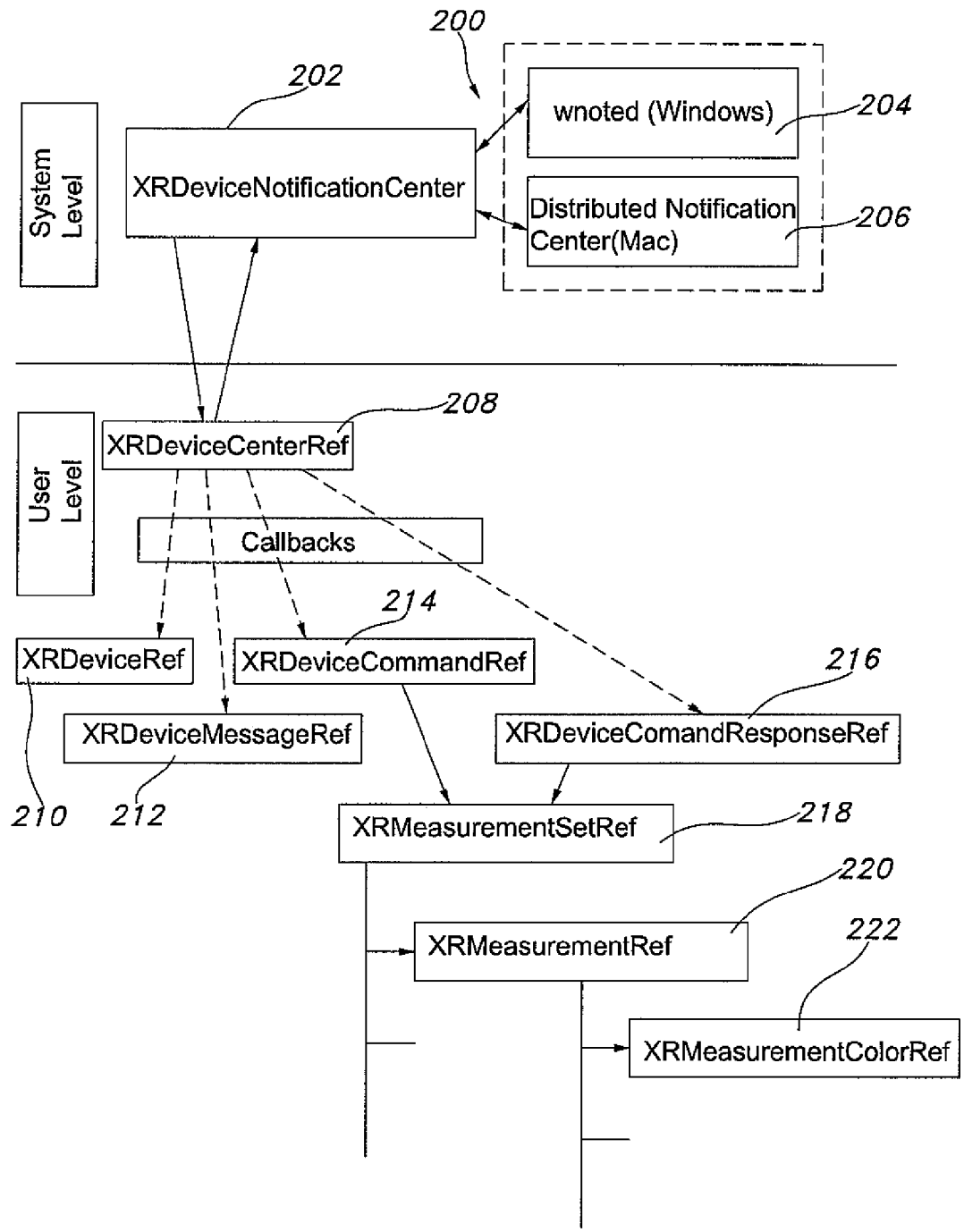
FIG. 3 is a further schematic illustration setting forth system level and user level communications associated with an exemplary implementation of the present disclosure.

Turning to FIG. 3, an additional schematic illustration is provided that depicts communication functionalities associated with an exemplary embodiment of the present disclosure. In the communication system 200 of FIG. 3, system level communications are controlled and facilitated at a system level by XRDeviceNotificationCenter 202. As schematically depicted in FIG. 3, XRDeviceNotificationCenter 202 may take the form of "wnoted" functionality 204 in a Windows environment and/or a Distributed Notification Center functionality 206 in a Mac environment. Alternative implementations may be designed and/or utilized without departing from the present disclosure.

XRDeviceNotificationCenter 202 is generally adapted to communicate with user level application(s) and/or instrument(s). Two-way communications are typically supported. With further reference to FIG. 3, XRDeviceNotificationCenter 202 communicates with XRDeviceCenterRef 208 at the user level for a particular application/instrument. XRDeviceNotificationCenter 202 is generally in communication with multiple XRDeviceCenterRef's, although for purposes of illustration, FIG. 3 schematically depicts only a single communication interface. In exemplary embodiments of the present disclosure, XRDeviceNotificationCenter 202 automatically broadcasts information that is received by XRDeviceCenterRef 208 at the user level. XRDeviceCenterRef 208 functions as a middle man between the individual application and device messaging systems. The object is generally a singleton, i.e., there is only one instance of XRDeviceCenterRef 208 for each system implementation. The SDK programming is generally adapted to ensure that the same instance of XRDeviceCenterRef 208 is returned, as needed by system operation.

XRDeviceCenterRef 208 makes available broadcast information received from XRDeviceNotificationCenter 202 to associated/low-level device messaging system(s). As shown in the exemplary schematic illustration of FIG. 3, XRDeviceCenterRef 208 communicates with XRDeviceRef 210, XRDeviceMessageRef 212, XRDeviceCommandRef 214 and XRDeviceCommandResponseRef 216. Thus, the object represented by XRDeviceCenterRef 208 is adapted to listen for different types of high level messages that may be available throughout the system. For instance, in the user level application needs to keep track of connected to a given workstation, the XRDeviceCenterRef 208 may be programmed (e.g., through user input) to monitor messaging for, inter alia, any device updates. Upon receipt of a device update, XRDeviceCenterRef 208 would forward such update for implantation, e.g., in updating a GUI associated with the device.

With further reference to FIG. 3, XRDeviceCommandResponseRef 216 is advantageously adapted for command response messaging. More particularly, XRDeviceCommandResponseRef 216 is generally adapted to generate a message in response to a command (XRDeviceCommandRef 214). Exemplary commands may include "measure", "calibrate" and the like. XRDeviceCommandResponseRef 216 may also generate a responsive message after a physical measurement is taken from or by a device. Upon receipt of such message, applications in system-based communication therewith would assess the nature of the response, e.g., from a command property glossary or the like. Thus, for example, if the response was generated in response to a "measure" command, the recipient application would be alerted to the fact that the response message includes measurement data/information.

As schematically depicted in FIG. 3, measurement information is generally encapsulated in XRMeasurementSetRef 218. This object may contain, inter alia, one or more XRMeasurementRef's 220. Generally, if a measurement is made using the subject device/application, the object will generally contain a single measurement reference. In an alternative implementation, e.g., where measurements are collected using a scanning mode or another mode that generates multiple measurements, the object will contain multiple XRMeasurementRef's 220. Multiple measurements (and multiple XRMeasurementRef's 220) may also be included in the object where the application/device is generating and/or transmitting a palette of measurements.

Of further note, an XRMeasurementRef 220 generally includes a list designated as XRMeasurementColorRef 222. Each color reference corresponds to the same measurement, but reflects different color reference type, e.g., Lab, sRGB, Spectral or any other reference type supported by the application/device. The color reference (XRMeasurementColorRef 222) also generally contains a list of values for each channel for the color type with which it is associated. Using these values and the chosen color type, an application can, for instance, set the foreground color.

From an overall system perspective, the disclosed systems and methods thus facilitate automatic, real-time broadcast of color measurement-related information to ancillary programs, instruments and/or applications that may be termed "listening" elements, i.e., units or applications that are adapted to listen for broadcasts from the OS program/daemon of the present disclosure by way of the OS Notification Center. Even if the color measurement instrument is turned "on" and "off" or otherwise interrupted in its operations, the communication systems associated with the OS daemon-based protocol of the present disclosure remain operative and effective. In at least this sense, the disclosed systems and methods support and facilitate a "connection-less" mode of color-related communications because the communication interface, once established through appropriate SDK implementation (and security clearance), remains in place without further connection-related steps.

Of note, individual listening elements according to the present disclosure may be programmed to selectively receive and process broadcast information, i.e., color measurement-related information that is available at OS Notification Center 112. In particular implementations, for example, individual listening elements may have a need for certain aspects of the color measurement-related information, but no use for other aspects of such color measurement-related information. In such circumstance, the OS Notification System nonetheless broadcasts all available information indiscriminately to all listening elements. Individual listening elements may, however, be adapted to limit the information that is "pulled into" such listening element, e.g., based on color attributes that are needed by such specific listening element. Implementation of such limiting/filtering functionality may be achieved through the client SDK associated with individual listening elements according to the present disclosure. Communications between the listening elements and the OS program/daemon by way of the OS Notification Center are generally subject to appropriate security clearance/validation and such communications may be advantageously encrypted, particularly when transmitted over a network, such as an intranet, extranet and/or the Internet.

Automatic broadcast of color measurement-related information, e.g., color measurement values and information related to the status/operation of a color measurement instrument, advantageously makes available such color measurement-related information for access and use by any other instrument, device and/or system associated with the disclosed system/method. Thus, in exemplary implementations of the disclosed system and method, various programs, instruments and applications are adapted to listen for broadcasted color measurement-related information, and the broadcast information becomes available for immediate use, e.g., in guiding or controlling ancillary operations and/or decision-making. In addition, the broadcast functionality and transfer of color measurement-related information is available in a continuous, uninterrupted manner, i.e., there is no need to log-on or otherwise initiate broadcast and/or transmission of color measurement-related information to a listening element that includes appropriate interface programming and security clearance, i.e., "connection-less" sharing of color measurement-related information that does not block other communications therewith. In addition, less user input and/or expertise is required to configure at the OS level according to the present disclosure. For example, automatic detection of the physical state of the color measurement instrument can be achieved, e.g., the OS-level software can recognize that that color measurement instrument has remained in the calibration position for a period of time and can advantageously initiate calibration without user input.

The disclosed color measurement and color management systems/methods offer significant advantages relative to existing systems/methods, including the facilitation of automatic, system-wide dissemination and/or accessibility of color measurement values and information concerning individual color measurement instruments, e.g., instrument-related messages (such as error messages), instrument status and the like. In exemplary implementations, when a color measurement instrument performs a measurement, e.g., based on an instrument user clicking a button, the system-level device implementation broadcasts the measurement data blindly to the OS program/daemon which in turn makes such information available at an OS Notification Center. Automatic broadcast of such information to any and all listening elements ensues, thereby maintaining real-time communications on a system-wide basis. Any application can be registered to receive the notifications from the OS Notification Center and can specify details/conditions as to receipt of such notifications, e.g., if the notifications will only be received when the application is in the foreground (has focus) or at any time.

System-level integration as permitted by the disclosed systems and methods enables any and all software to receive color measurement-related information without a need to maintain an explicit handle to the device. Such system-level integration offers many advantages. For example, such integrations advantageously allows a color measurement instrument to be calibrated only once, rather than within each application that will make use of its measurements. In addition, such system-level integration eliminates the need for a user to connect-disconnect-reconnect to a color measurement instrument as he/she moves between different applications. Further, the disclosed systems and methods greatly simplify receipt of color measurement-related information in a new software application. Previous requirements for ad hoc programming to handle every function and event is replaced with a simple call to register for a specific OS-level event (perhaps as few as three calls to fully implement).

An exemplary workflow according to the present disclosure involves the following steps:

A system user plugs a color measurement instrument into a computer/processor that is adapted to run an OS program that supports, inter alia, the SDKs and OS Notification Center as described above in accordance with the present disclosure;

From the system tray in Windows or status menu on a Mac, the user selects "calibrate" to put the device in the ready state. If the user does not perform this action, then he/she may be prompted to do so the first time the device button is pressed (requested measurement).

When a measurement is performed, a dataset is prepared including, e.g., spectral data and optionally additional color types (e.g., L*A*B, SRGB, or the like), which are blindly broadcast to the system.

Any and all applications registered to receive measurement data will have the data-packet arrive and can process it.

Although the systems and methods have been described herein with reference to exemplary embodiments and implementations thereof, it is to be understood that the present disclosure is not limited by or to such exemplary embodiments. Rather, the systems and methods of the present disclosure are susceptible to various modifications, variations and/or enhancements without departing from the spirit or scope hereof. Accordingly, the present disclosure expressly encompasses within its scope all such modifications, variations and/or enhancements.

The invention claimed is:

1. A color measurement system, comprising:
   a. at least one color measurement instrument in communication with an operating system program that is adapted to communicate color measurement-related information to an OS notification center; and
   b. at least one program, instrument or application in communication with the OS notification center for automatic receipt of a notification that color-measurement-related information has been received from the at least one color measurement instrument at said OS notification center;
   wherein the operating system program is adapted to automatically broadcast a notification to said at least one program, instrument or application when color measurement-related information is received at said OS notification center; and
   wherein the operating system program is adapted to (i) maintain a continuous connection with the at least one color measurement instrument through an application programming interface, (ii) broadcast color measurement-related information to the at least one program, instrument or application that is programmed to listen for such broadcast, and (iii) receive at least one command or other input from said at least one program, instrument or application.

2. The color measurement system of claim 1, wherein the at least one color measurement instrument includes a processor, and wherein said operating system program and said OS notification system run on said processor.

3. The color measurement system of claim 1, wherein the at least one color measurement instrument communicates with the operating system program through a programming interface.

4. The color measurement system of claim 1, wherein communication between the at least one color measurement instrument and the at least one program, instrument or application is effected in the absence of an application-to-application communication link.

5. The color measurement system of claim 1, wherein the automatic broadcast includes color measurement-related information.

6. The color measurement system of claim 1, wherein the color measurement-related information includes at least one of: (i) parameters associated with making a color measurement determination, (ii) one or more values obtained from such color measurement determination, (iii) corrections or adjustments to such color measurement values, (iv) messages or signals associated with operation of the at least one color measurement instrument, (v) status information concerning the at least one color measurement instrument, and (vi) combinations thereof.

7. The color measurement system of claim 1, wherein the at least one program, instrument or application is programmed to listen for broadcast notifications initiated by said operating system program.

8. The color measurement system of claim 1, wherein the at least one program, instrument or application is registered to receive broadcast color measurement-related information according to one or more predetermined parameters.

9. The color measurement system of claim 1, wherein the operating system program is adapted to communicate with a plurality of programs, instruments or applications with respect to color measurement-related information in the absence of establishing an application-to-application communication link.

10. A method for communicating color measurement-related information, comprising:
    a. providing at least one color measurement instrument in communication with an operating system program that is adapted to communicate color measurement-related information to an OS-notification center, wherein the operating system program is further adapted to (i) maintain a continuous connection with the at least one color measurement instrument through an application programming interface, (ii) broadcast color measurement-related information to the at least one program, instrument or application that is programmed to listen for such broadcast, and (iii) receive at least one command or other input from said at least one program, instrument or application;

b. obtaining color measurement-related information from said at least one color measurement instrument; and c. automatically broadcasting the color measurement-related information to the OS notification center and at least one registered program, instrument or application in communication with the OS notification center.

11. The method of claim 10, further comprising receiving communications from at least one registered program, instrument or application at the OS notification center.

12. The method of claim 10, wherein the color measurement-related information is broadcast to said at least one registered program, instrument or application in the absence of an application-to-application communication link.

13. The method of claim 10, wherein the color measurement-related information is automatically and simultaneously broadcast to a plurality of registered programs, instruments or applications.

14. The method of claim 10, wherein the at least one registered program, instrument or application is registered to receive broadcast color measurement-related information according to one or more predetermined parameters.

15. The method of claim 10, wherein the color measurement-related information includes at least one of: (i) parameters associated with making a color measurement determination, (ii) one or more values obtained from such color measurement determination, (iii) corrections or adjustments to such color measurement values, (iv) messages or signals associated with operation of the at least one color measurement instrument, (v) status information concerning the at least one color measurement instrument, and (vi) combinations thereof.

16. The color measurement system of claim 1, wherein the at least one color measurement instrument is selected from the group consisting of a spectrophotometer, a colorimeter and a densitometer.

17. The method of claim 10, wherein the at least one color measurement instrument is a spectrophotometer, colorimeter or densitometer.

* * * * *